United States Patent
Kota et al.

(10) Patent No.: US 10,767,675 B2
(45) Date of Patent: Sep. 8, 2020

(54) DEPLOYABLE COMPLIANT MECHANISM

(71) Applicant: FLEXSYS, INC., Ann Arbor, MI (US)

(72) Inventors: Sridhar Kota, Ann Arbor, MI (US); Robert Schartow, Chelsea, MI (US)

(73) Assignee: FLEXSYS, INC., Ann Arbor, MI (US)

( * ) Notice: Subject to any disclaimer, the term of this patent is extended or adjusted under 35 U.S.C. 154(b) by 409 days.

(21) Appl. No.: 15/584,263

(22) Filed: May 2, 2017

(65) Prior Publication Data
US 2017/0314588 A1    Nov. 2, 2017

Related U.S. Application Data

(60) Provisional application No. 62/330,320, filed on May 2, 2016.

(51) Int. Cl.
*F16B 1/04* (2006.01)
*F16B 1/00* (2006.01)
(Continued)

(52) U.S. Cl.
CPC ............ *F16B 1/04* (2013.01); *B33Y 40/00* (2014.12); *F16B 1/0057* (2013.01); *F16B 2/04* (2013.01);
(Continued)

(58) Field of Classification Search
CPC . F16B 1/04; F16B 1/0057; F16F 9/306; F16L 3/003
See application file for complete search history.

(56) References Cited

U.S. PATENT DOCUMENTS

| 7,395,136 B2 * | 7/2008 | Osten ...................... B25J 9/1623 700/245 |
| 2005/0262959 A1 * | 12/2005 | Angeles ................... B23Q 1/52 74/490.01 |

(Continued)

*Primary Examiner* — David M Fenstermacher
(74) *Attorney, Agent, or Firm* — Dickinson Wright PLLC

(57) ABSTRACT

A mechanism is hereby disclosed that, when activated in the linear direction of its axis, will expand and contract radially. The novel nature of the device is that of compliant methods and materials used in its design. Compliant members, referred to as dyads, translate the motion and imply resistance in a single structure. Thus eliminating the need for separate members, hinges, pins, springs and the associated assembly. When these compliant dyads are combined in the novel configurations hereby disclosed, a device is created that expands (or contracts) in multiple directions from its primary axis of actuation. Furthermore, one or more actuation dyad sets could be arranged at various angles relative to the global vertical axis. The radial expansion/contraction can be 2D or 3D by adding more primary activation dyad sets. Such a device can be applied to many applications and industries. One such application is for gripping the inside of a tube or object for moving manually or in automation. The compliant nature of this device can be optimized to auto-adapt to the objects size and shape allowing for greater part variation and reduce manufacturing line change-over times. Other applications would include snap fit connections, spherical articulating joints, spinning cutting tools, speed limiting using friction and centrifugal force, braking rotational forces or transmitting it, automatic centering, expanding elastic bands in an assembly process, and stretching an opening for fitment. The design of this device is material friendly and can be made of plastic, composite and metals. It may be of a single monoform construction (created by molding, machining, or additive manufacturing) or made of multiple parts including pivots and different materials to achieve the desired articulation.

13 Claims, 6 Drawing Sheets

(51) Int. Cl.
*B33Y 40/00* (2020.01)
*F16F 9/30* (2006.01)
*F16L 3/00* (2006.01)
*F16B 2/04* (2006.01)
*E21B 23/00* (2006.01)

(52) U.S. Cl.
CPC ............. *F16F 9/306* (2013.01); *F16L 3/003* (2013.01); *E21B 23/001* (2020.05); *F16B 2001/0007* (2013.01)

(56) References Cited

U.S. PATENT DOCUMENTS

| | | | | |
|---|---|---|---|---|
| 2009/0019960 A1* | 1/2009 | Nabat | .................. | B25J 17/0266 74/490.03 |
| 2011/0132131 A1* | 6/2011 | Worz | .................... | B25J 9/1623 74/490.05 |
| 2014/0020500 A1* | 1/2014 | Briot | ..................... | B25J 9/1065 74/490.05 |
| 2014/0230594 A1* | 8/2014 | De Bie | ................... | B25J 18/00 74/490.01 |
| 2014/0311271 A1* | 10/2014 | Cao | ........................ | B25J 9/0036 74/490.05 |
| 2014/0331808 A1* | 11/2014 | Reid | ..................... | B25J 9/0078 74/490.04 |
| 2014/0360306 A1* | 12/2014 | Mihara | ................. | B25J 9/0051 74/490.02 |
| 2015/0316129 A1* | 11/2015 | Larochelle | ............. | F16H 21/40 700/275 |

* cited by examiner

DEPLOYABLE COMPLIANT MECHANISM

CROSS-REFERENCE TO RELATED APPLICATION

This application claims the benefit of priority to U.S. Provisional Application No. 62/330,320, filed May 2, 2016, under 35 U.S.C. § 119(e), the content of which is incorporated by reference herein in its entirety.

FIELD OF USE

This application relates to a deployable compliant mechanism that can be used in at least the following fields or for the following uses:
Manual and robotic gripping and positioning.
Braking rotational motion or creating it.
Expanding an opening or pipe joint.
Sanding or grinding a cylindrical or spherical surface.
Centering within a larger hole.
Speed limiting using centrifugal force.
Expanding elastic rings for assembly.
Snap-lock couplers and joints.
Universal joints.
Cutting tool with actively variable diameters.

SUMMARY

A mechanism is hereby disclosed that, when activated in the linear direction of its axis, will expand and contract radially. The novel nature of the device is that of compliant methods and materials used in its design. Compliant members, referred to as dyads, translate the motion and imply resistance in a single structure. Thus eliminating the need for separate members, hinges, pins, springs and the associated assembly. When these compliant dyads are combined in the novel configurations hereby disclosed, a device is created that expands (or contracts) in multiple directions from its primary axis of actuation. Furthermore, one or more actuation dyad sets could be arranged at various angles relative to the global vertical axis. The radial expansion/contraction can be 2D or 3D by adding more primary activation dyad sets. Such a device can be applied to many applications and industries. One such application is for gripping the inside of a tube or object for moving manually or in automation. The compliant nature of this device can be optimized to auto-adapt to the objects size and shape allowing for greater part variation and reduce manufacturing line change-over times. Other applications would include snap fit connections, spherical articulating joints, spinning cutting tools, speed limiting using friction and centrifugal force, braking rotational forces or transmitting it, automatic centering, expanding elastic bands in an assembly process, and stretching an opening for fitment. The design of this device is material friendly and can be made of plastic, composite and metals. It may be of a single monoform construction (created by molding, machining, or additive manufacturing) or made of multiple parts including pivots and different materials to achieve the desired articulation.

DETAILED DESCRIPTION

Figure 1:
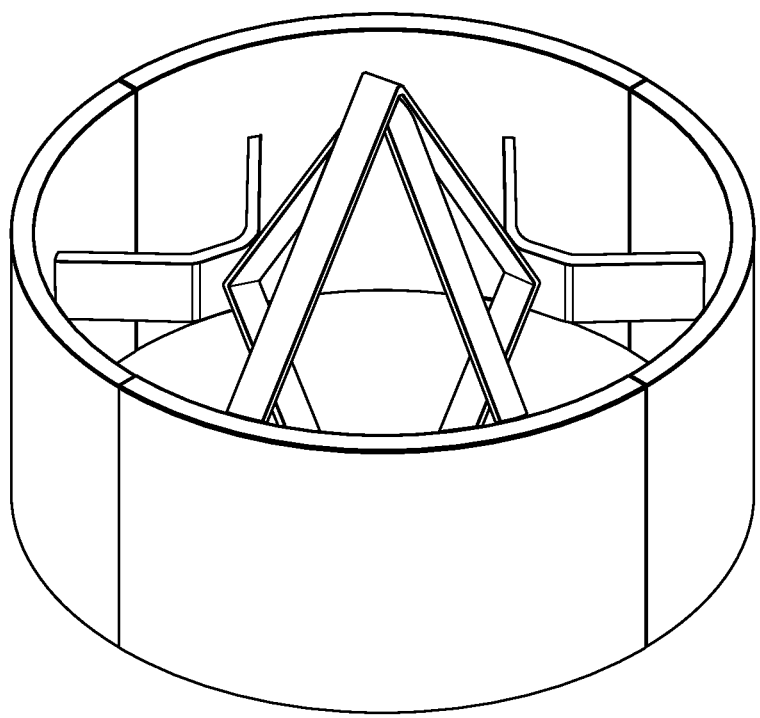
FIG. 1 illustrates an embodiment of a deployable compliant mechanism having three sets of primary actuation dyads.

The embodiment shown in FIG. 1 has three sets of primary actuation dyads (each connected to corresponding three sets end effector dyads and end effectors) arranged in a substantially vertical direction. In other embodiments, there could be less than three (at least one set primary actuation dyad). Furthermore, one or more actuation dyad sets could be arranged at various angles relative to the global vertical axis.

The device can be made as a single monoform using compliant material(s) or assembled from compliant parts resulting in reduced cost manufacturing The device can be absent of hinges, thereby deriving the benefits thereof. Absence of hinges, springs and pins results in reduced complexity and cost. Low manufacturing cost lends the device to being disposable in applications where this is preferred.

Components of the device can be made with optimum thickness and contour for required force and spring pressure.

The device can be radial.

The device can be made to be bi-stable.

Figure 2A:
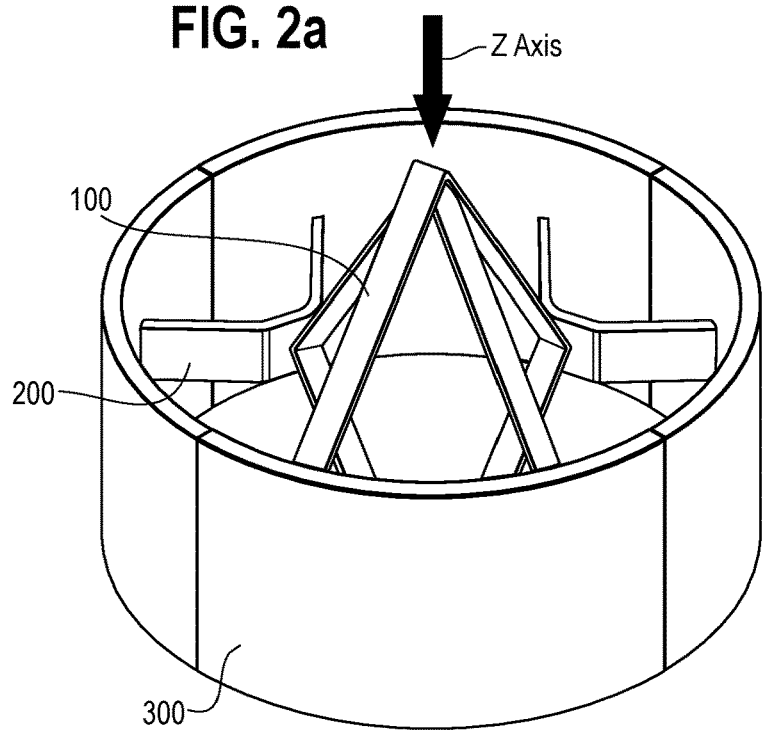
FIGS. 2a and 2b illustrate motion and force translated along the Z-axis to motion along the radial direction in a plane substantially perpendicular to the Z-axis.
Figure 2B:
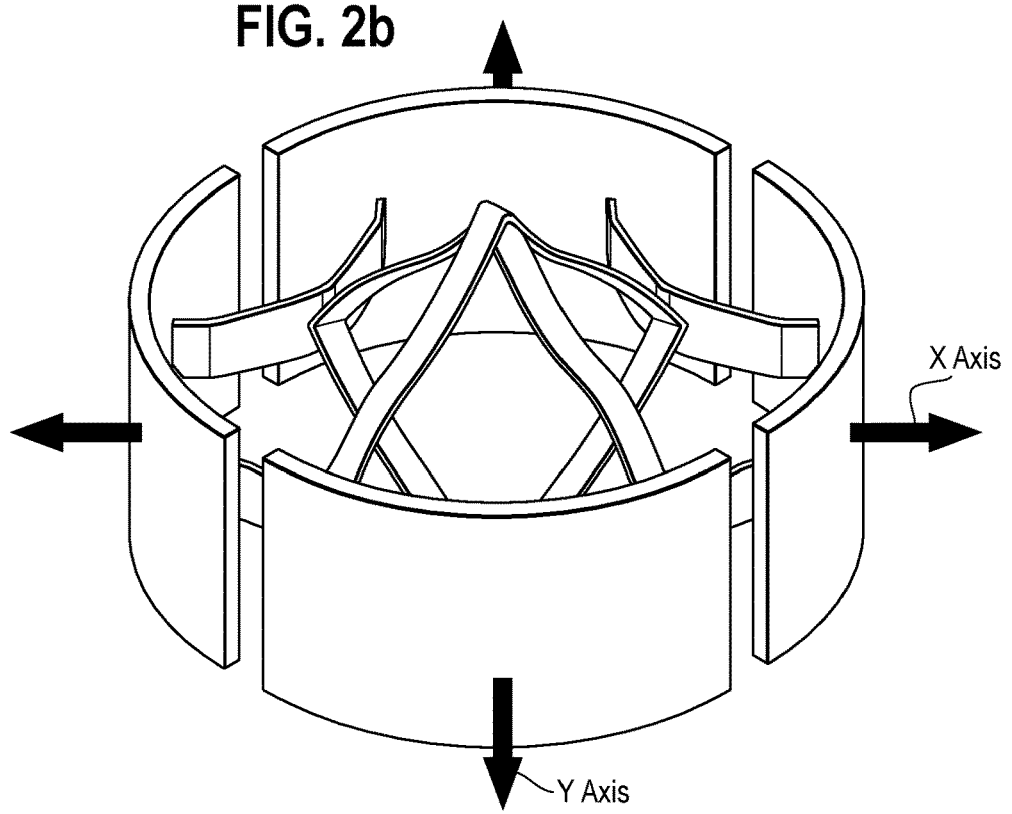

With reference to FIGS. 2a and 2b, motion and force is translated from force along the Z-axis to motion along the radial direction in a plane substantially perpendicular to the Z-axis. Conversely, motion can be translated from forces along the radial direction to the Z-axis The device includes, but is not limited to, the following parts: (100) Primary activation dyad arms; (200) Optional expansion dyad extensions; (300) End effector or contact surface. Note: A dyad is a set of two members intersecting at an angle such as a letter "V." The device can be configured with any number of primary activation dyad arms (100) and end effectors (300).

With reference to FIGS. 3-6b, the embodiment illustrated in FIGS. 3-6b has three sets of primary actuation dyads (100), each connected to corresponding three secondary dyads (200), and end effectors (300) arranged in a substantially vertical direction.

In other embodiments, there could be more than three, less than three, but at least one set of primary actuation dyad. Furthermore, one or more actuation dyad sets could be arranged at various angles (400) relative to the global vertical axis.

Figure 3A:
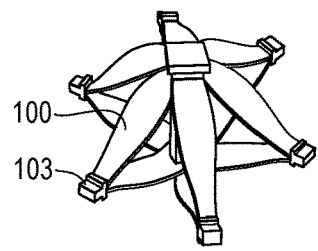
FIGS. 3a and 3b illustrate an embodiment of a deployable compliant mechanism having three sets of primary actuation dyads with no end effector attached.
Figure 3B:
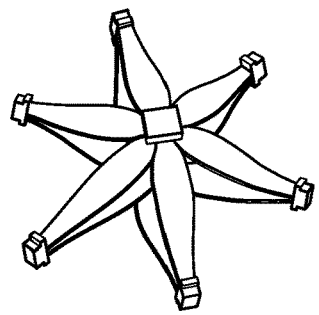

With reference to FIGS. 3a-3b, there are shown three sets of primary activation dyads (100) with no end effector attached. The device is shown here with a snap fit feature (103) for secondary dyads or end effector attachment.

Figure 4A:
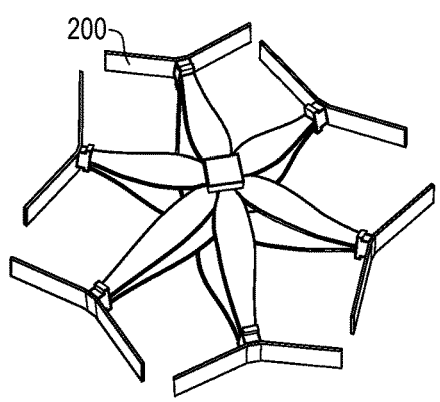
FIGS. 4a and 4b illustrate an embodiment of a deployable compliant mechanism having secondary dyads that are attached to primary dyad arms.
Figure 4B:
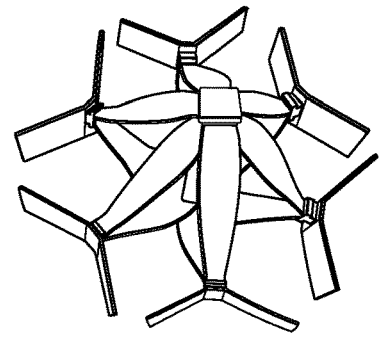

With reference to FIGS. 4a-4b, secondary dyads (200) are attached to primary dyad arms. Alternatively end effectors are attached directly to the primary dyads.

Figure 5A:
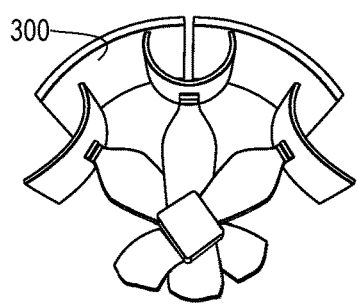
FIG. 5a illustrates an embodiment of a deployable compliant mechanism having end effectors attached to secondary dyads.

With reference to FIG. 5a, end effectors (300) are shown attached to secondary dyads. End effectors can be of various shapes, sizes and radii, and alternatively of compliant material to change radius as the system expands and contracts.

Figure 5B:
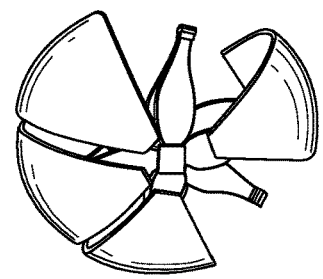
FIG. 5b illustrates an embodiment of a deployable complaint mechanism having spherical end effectors attached directly to primary actuation dyads.

With reference to FIG. 5b, spherical shaped end effectors are attached directly to primary actuation dyads.

Figure 6A:
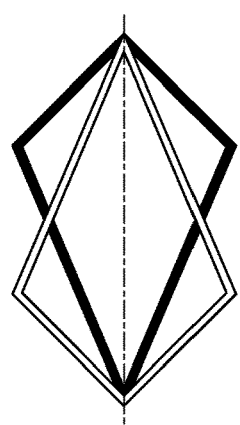
FIGS. 6a and 6b illustrate an example of one or more primary actuation dyad sets designed and arranged to produce actuation and an angle to the global vertical axis.
Figure 6B:
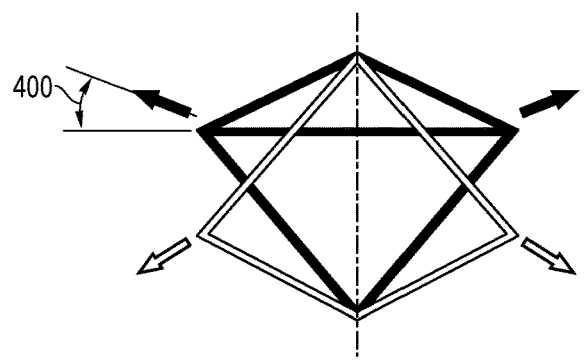

With reference to FIGS. 6a and 6b, one example is shown of one or more primary actuation dyad sets designed and arranged to produce actuation and an angle (400) relative to the global vertical axis.

Figure 7A:
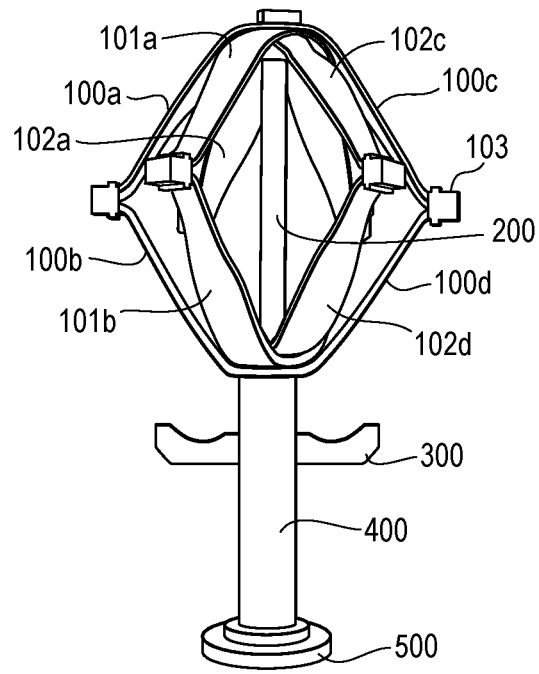
FIG. 7a illustrates an embodiment of a deployable compliant mechanism in a steady state form.
Figure 7B:
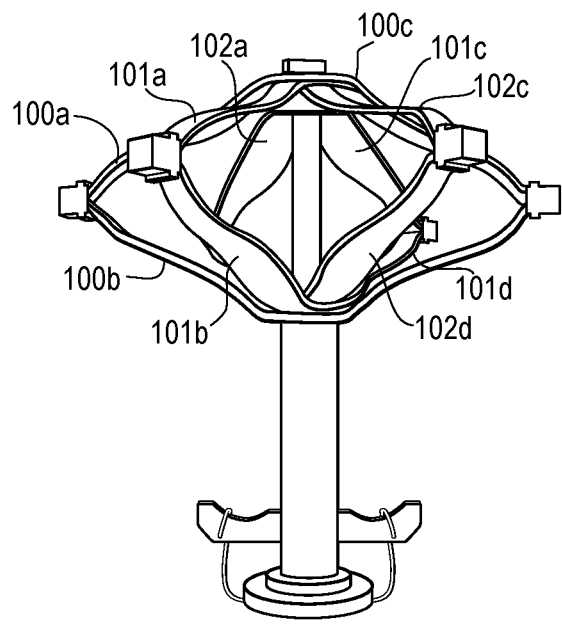
FIG. 7b illustrates the mechanism of FIG. 7a activated to cause radial expansion.

One example embodiment of a device is shown in FIGS. 7a and 7b. FIG. 7a shows a device in steady state form, and FIG. 7b shows the same device activated to cause radial expansion of the Primary Activation Dyad sets (100-102). Each set 100, 101, and 102 are a single monoform element. Primary Activation Dyads provide spring loading or bi-stable positions.

An attachment feature (103) on Primary Activation Dyad for attaching End Effectors or Secondary Dyads is also shown.

A Compression Rod (200) is used to position, compress and expand the Primary Activation Dyads.

A Trigger (300) is attached to the Compression Rod (200) and is used to apply load in an opposing direction of the steady state of the Primary Activation Dyads. The Trigger moves collinear to the Compression Rod (200) and is guided and captured within Rod Guide (400).

The Rod Guide houses the Compression Rod (200) and Trigger (300), allowing motion only collinear to the Compression Rod.

A Palm Rest (500) closes out the end of Rod Guide and is used to apply counter activation pressure/loading.

Figure 8:
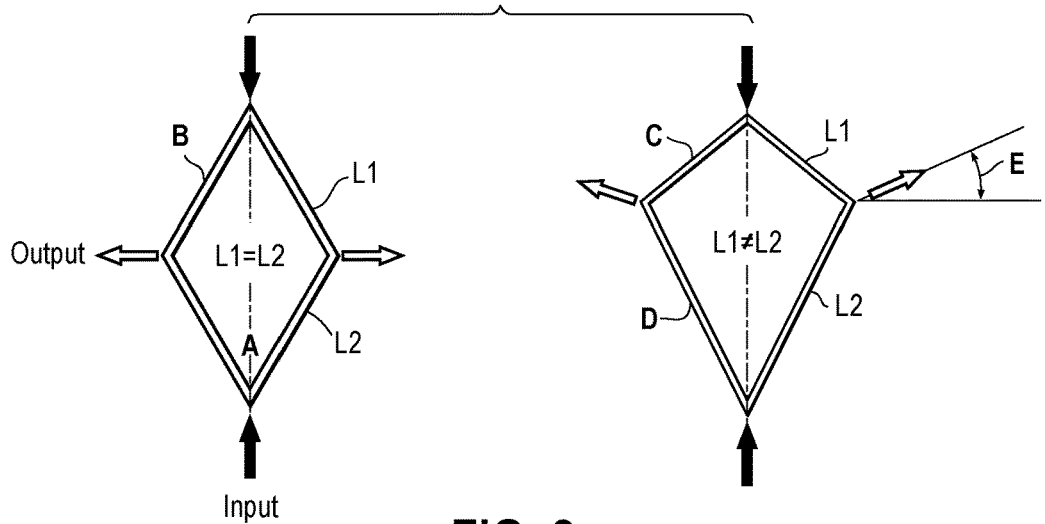
FIG. 8 illustrates primary dyad sets having different geometry and differing output motion.
Figure 9:
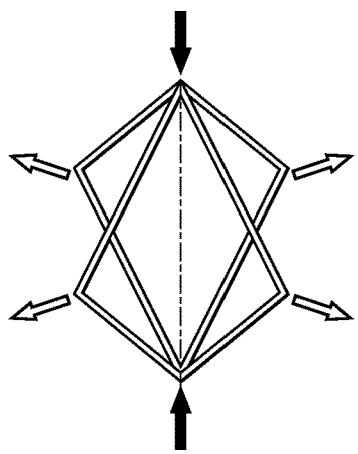
FIG. 9 illustrates differing output motion of different geometry of the primary dyad sets.
Figure 10:
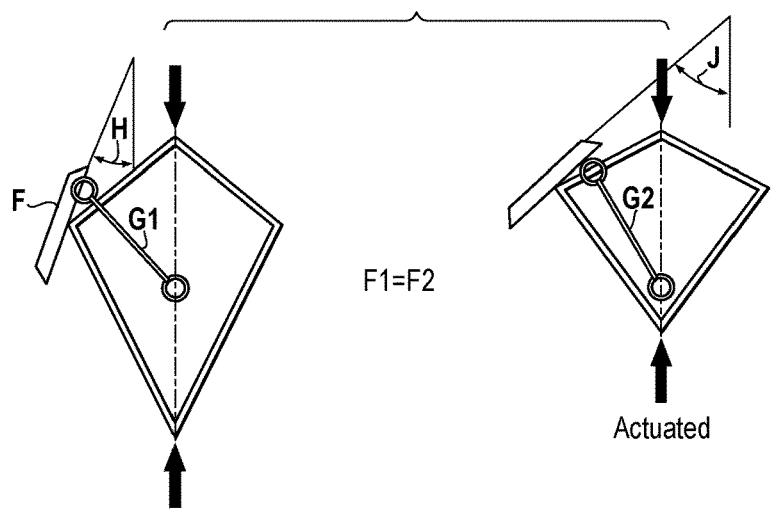
FIG. 10 illustrates control surfaces coupled to the primary dyads and including secondary restraints.

With reference to FIGS. 8-10, in FIG. 8, L1=L2 of primary activation dyad set B resulting in an output motion predominantly normal to the Input and axis A. When L1≠L2, (dyads C&D) various angles of motion E are achieved other than normal to axis A. Dyad C&D beam geometry can be optimized in size, cross-sectional area, and material to influence the magnitude and direction of resulting direction E. One or more dyad sets could be arranged at various angles relative to the global vertical axis, as well as various L1 & L2 configurations to achieve complex expansion shapes and diameters, as shown in FIG. 9.

Furthermore, control surfaces F (FIG. 10) of arbitrary geometry can be integrally molded with the dyads, or rigidly coupled (adhesive, welded, snap fitted, etc.), or kinematically coupled to pivot (1 degree of rotation) or using a universal or spherical attachment for 2, 3 degrees of rotation. By adding secondary actuation or constraint G, the control surface F can be manipulated to change from angle H to angle J upon actuation.

Figure 11:
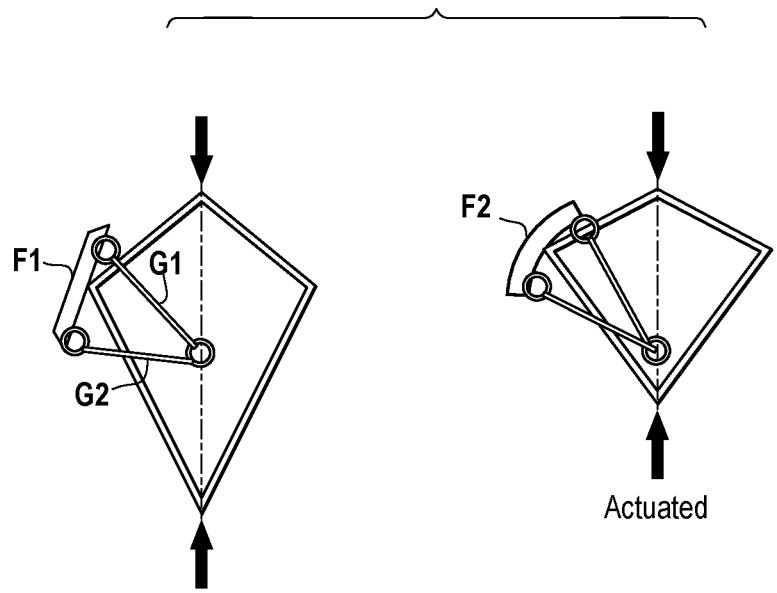
FIG. 11 illustrates another example of a constraint.

With reference to FIG. 11, to optimize the degree of rotation of control surface F, G can be rigid (rod, string) or it can be active pulling or pushing on the control surface. Alternatively G can be a secondary dyad.

Furthermore, control surface F can be of compliant material and activated in such a way to change shape such that F1≠F2 after actuation.

Figure 12:
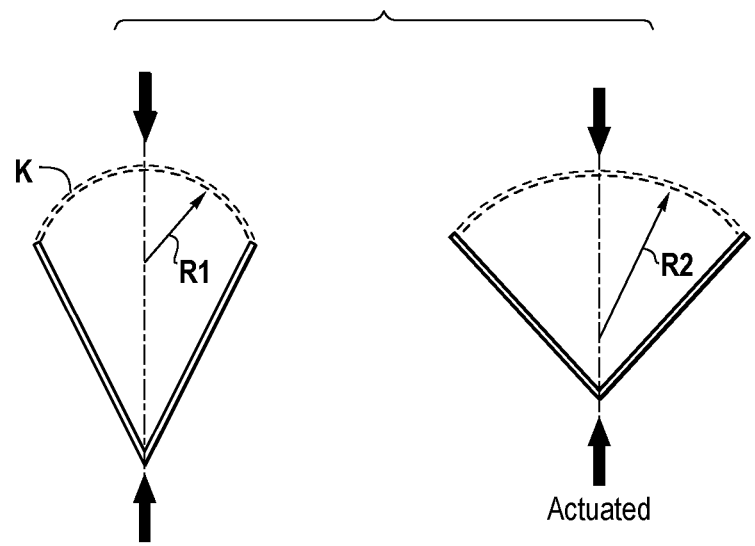
FIG. 12 illustrates an embodiment having a curved dyad.

A further embodiment is that dyad K is curved, as shown in FIG. 12. With actuation the curvature R1 becomes that of R2. Integrated cutting features can be integrated on the surface of K, and many of these dyad sets positioned radially around axis A to create a cutting tool.

What is claimed is:

1. A compliant mechanism comprising:
   at least one set of two primary actuation dyads, each primary actuation dyad including two deformable members arranged at an angle relative to each other and intersecting at an intersection point, wherein the primary actuation dyads are flexible to move between a first position and a second position by elastic deformation of the primary dyads, wherein the second position is axially compressed relative to the first position, and the second position is radially expanded relative to the first position;
   an end effector coupled to each of the primary actuation dyads at the intersection point thereof, the end effectors being moveable radially outward in response to the primary actuation dyads from the first position to the second position.

2. The compliant mechanism of claim 1 further comprising one or more secondary dyads attached to at least one individual one of the primary actuation dyads at the intersection point thereof.

3. The compliant mechanism of claim 2, wherein the end effector is coupled to the primary actuation dyads via the secondary dyads.

4. The compliant mechanism of claim 2, wherein adjacent end effectors are coupled to each other via the second secondary dyads.

5. The compliant mechanism of claim 1, wherein the end effectors have a partial sphere shape.

6. The compliant mechanism of claim 1, wherein the end effectors have a partial cylinder shape.

7. The compliant mechanism of claim 1, wherein the primary actuation dyads provide spring loading or bi-stable positions.

8. The compliant mechanism of claim 1, further comprising an attachment feature disposed at the intersection point for attaching a secondary dyad or the end effectors.

9. The compliant mechanism of claim 1, wherein the set of two primary actuation dyads is a single monoform element.

10. The compliant mechanism of claim 8, wherein the attachment feature is a snap-fit attachment feature.

11. The compliant mechanism of claim 1, wherein the members of the primary actuation dyads are the same length.

12. The compliant mechanism of claim 1, wherein the members of the primary actuation dyads are different lengths.

13. The compliant mechanism of claim 1, wherein the at least one set of two primary actuation dyads comprises a first set and a second set, and the intersection point of the first set is at a different axial position than the intersection point of the second set when in the first position.

* * * * *